Dec. 12, 1950 J. O. TURNER 2,533,537
MACHINE FOR HARVESTING PEANUTS
Filed May 12, 1947 3 Sheets-Sheet 1

Inventor
Jesse O. Turner

By Clarence A. O'Brien
and Harvey B. Jacobson
Attorneys

Dec. 12, 1950          J. O. TURNER          2,533,537
MACHINE FOR HARVESTING PEANUTS
Filed May 12, 1947          3 Sheets-Sheet 2
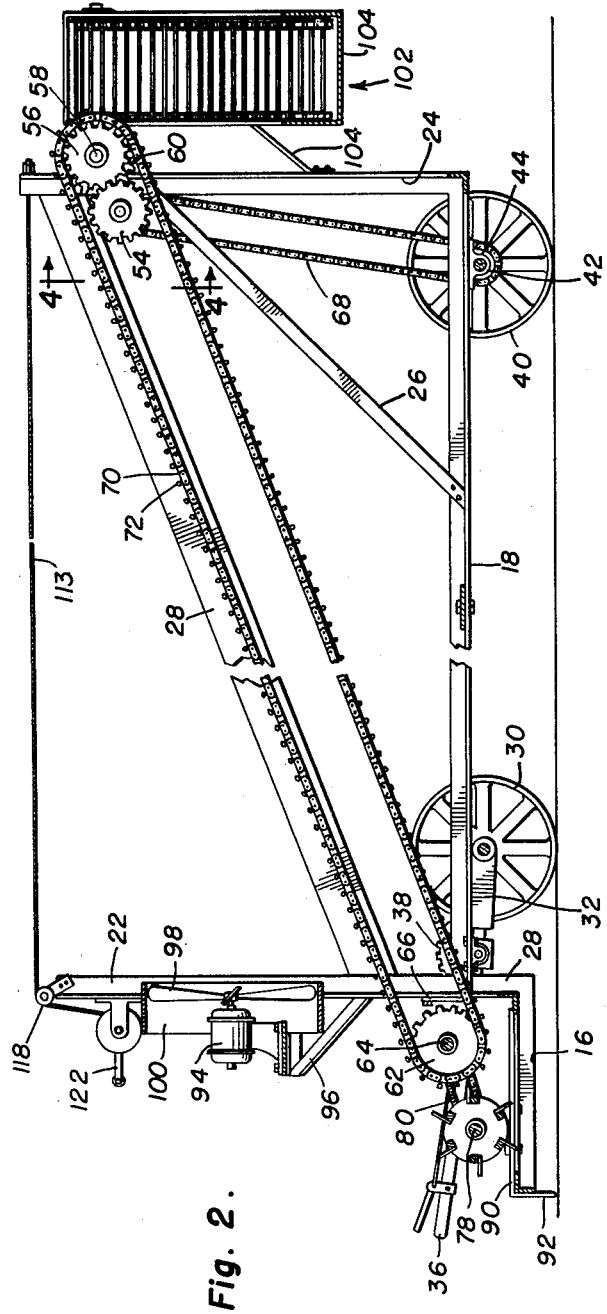
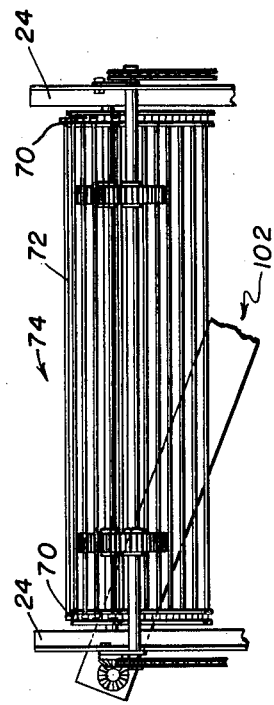
Inventor
Jesse O. Turner
By *Clarence A. O'Brien and Harvey B. Jacobson*
Attorneys Dec. 12, 1950     J. O. TURNER     2,533,537
MACHINE FOR HARVESTING PEANUTS
Filed May 12, 1947     3 Sheets-Sheet 3
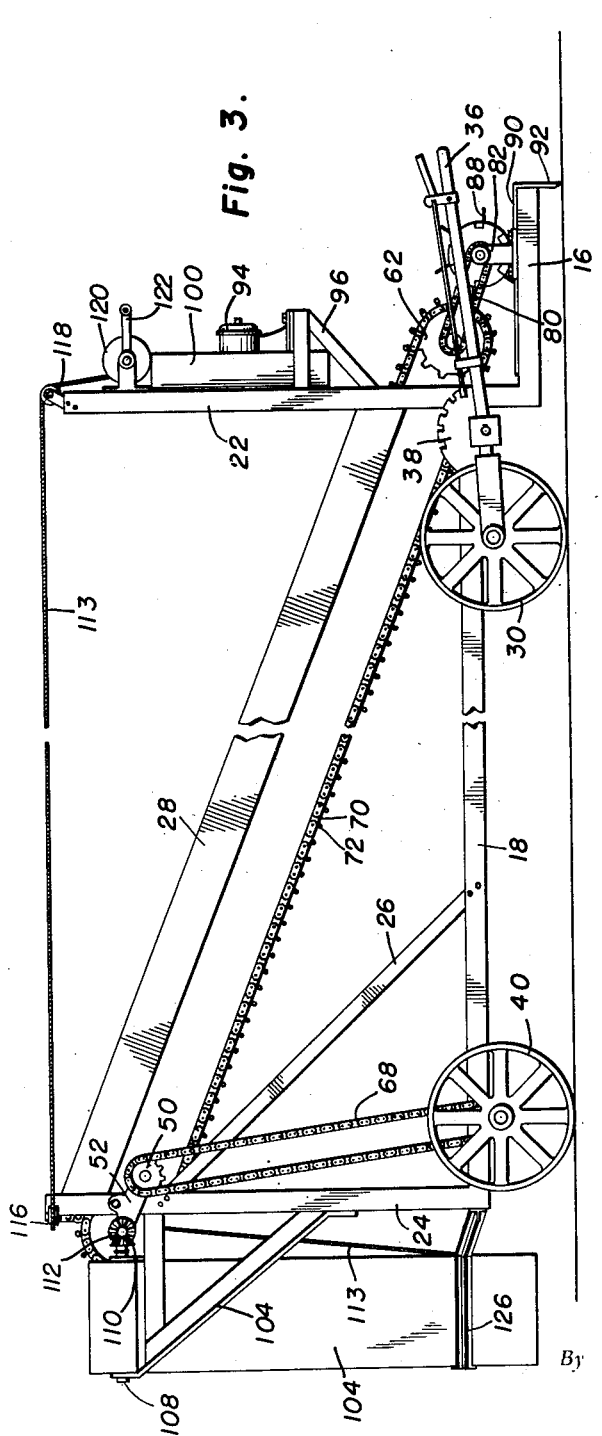
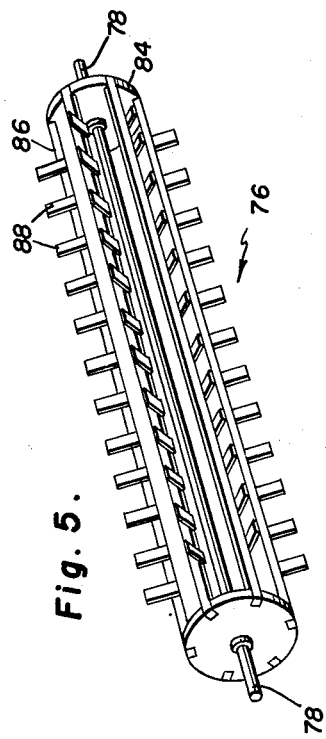
Inventor
Jesse O. Turner Patented Dec. 12, 1950

2,533,537

UNITED STATES PATENT OFFICE 2,533,537

MACHINE FOR HARVESTING PEANUTS

Jesse O. Turner, Denison, Tex.

Application May 12, 1947, Serial No. 747,534

4 Claims. (Cl. 55—134)

This invention relates generally to peanut harvesters and more particularly to a machine of this type in which the digger is mounted on the tractor used to draw the remaining portions of the machine, which portions are mounted on a wheeled frame.

A primary object of this invention is to provide means whereby peanuts may be expeditiously harvested, the digger being used to force the vines and the peanuts out of the ground and to elevate the same onto a platform from which they are picked up and conveyed upwardly and rearwardly, being simultaneously agitated by an air blast to assist in removing earth clinging to the vines, and finally to deposit these vines in a windrow.

Another object of this invention is to harvest the crop and clean the earth from the vines, without removing an unduly great proportion of the peanuts from the vines, thus facilitating the subsequent operation of picking up the harvested vines and threshing the same.

Still another object of this invention is to provide a machine which is well adapted for use under varying conditions, being adjustable as to height, and the delivery chute having means incorporated therewith in order that one end of the chute may be raised when the machine is being turned at the end of a row and when the machine is being transported from one scene of operation to another.

Still another object of this invention is to combine with a peanut harvester a blower to provide for general agitation of the vines and to urge the same upwardly and rearwardly on the above mentioned conveyor.

Still another object of this invention is to provide novel and improved means for transferring the vines onto the conveyor, and to provide an improved conveyor and delivery chute.

And a last object to be specifically mentioned is to provide a machine of this general character which is relatively inexpensive and practicable to manufacture, extremely simple and convenient to use, and which will give generally efficient and durable service.

With these objects definitely in view, this invention resides in certain novel features of construction, combination and arrangement of parts and portions as will be hereinafter described in detail, and particularly pointed out in the appended claims, one embodiment of this invention being illustrated in the accompanying drawings which form a material part of this application, and in which:

Figure 2 is a side elevational view of this invention with the said digger removed;

Figure 3 is another side elevational view of this machine, the view being taken from the side of the machine opposite to that from which the view shown in Figure 2 is taken;

Figure 4 is a fragmentary detail view of the upper end of the conveyor and contiguous portions of structure, the view being taken on the line 4—4 in Figure 2; and Figure 5 is a perspective view of the rotary cylinder used to pick up the vines from the platform and deliver the same onto the conveyor.

Similar characters of reference designate similar or identical parts and portions throughout the several views and throughout the specification.

Figure 1:
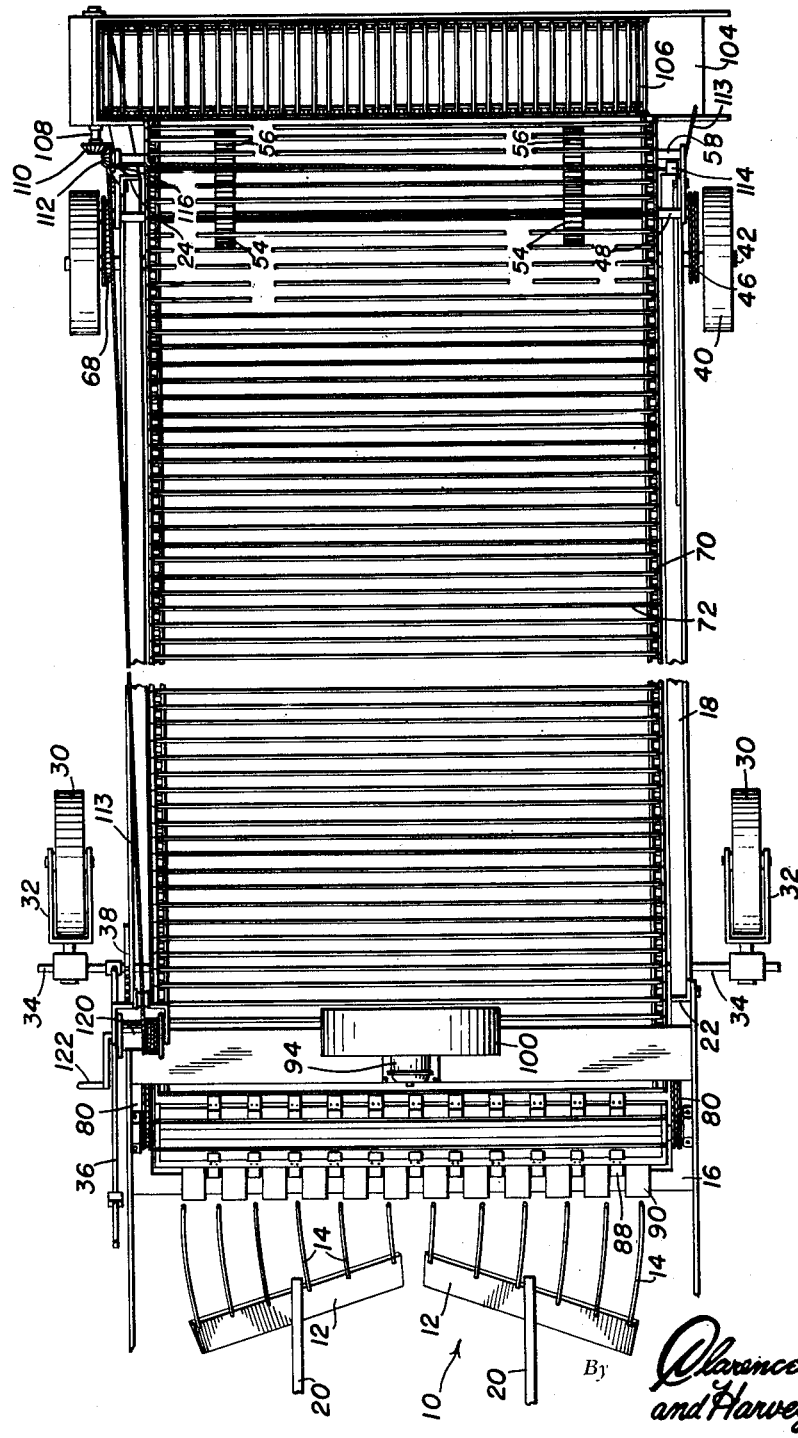
Figure 1 is a top plan view of the assembled invention, the digger which is secured to the tractor being shown in operative position at the front end of the platform upon which the vines are placed after being dug by the said digger.

Referring now to these drawings in detail, the digger, generally represented by the numeral 10, is comprised of two similar portions each having a plow portion 12 and a plurality of tangs 14. The plow portions 12 are sharpened at the forward edges and may be generally rectangular in shape, and the angular disposition thereof represented in Figure 1 causes the vines to be deflected inwardly toward the center line of the machine. The tangs 14 extend upwardly and rearwardly in similar arcs, and the rear terminals of these tangs are colinear and adjacent to the forward side of the platform 16. It should be carefully noted that the diggers will ordinarily be mounted on the frame of the tractor which is used to draw the peanut harvester, that is, to draw that portion of the peanut harvester which is mounted on the wheeled frame 18, since for purposes of this disclosure, the diggers must be considered as an integral part of this invention. Any suitable means may be used to mount these diggers on the said tractor, a simple supporting bar 20 being represented in Figure 1, to indicate one method of directly attaching the plow portions 12 to the tractor.

The wheeled frame 18 is generally rectangular having a forward upright member 22 and a rear upright member 24, a brace for this rear upright member, as illustrated at 26, and the above mentioned platform portion 16 which is rigidly secured to the lower end of an extending portion 23 of the front upright member 22.

A conveyor housing 28 of trough form is diagonally supported on the above described frame, with the rear of said housing being secured to the upper portion of the rear upright member 24, and the forward end of the housing being secured adjacent the lower end of the forward upright member 22. Front wheels 30 are freely rotatably mounted in forks 32 which are securely attached to an axle member 34. A hand control lever 36 is rigidly secured to this axle member 34 and a pawl and ratchet device 38 is secured to the frame 18, in order to facilitate the adjustment and locking of this axle in any one of a variety of positions, thus allowing for the vertical adjustment of the fore part of the frame with reference to the height thereof above the level of the ground. This adjustability of the frame is required in order that the platform 16 may be brought into proper relationship with the tangs 14.

The rear wheels 40 are rigidly secured to a rotatable axle 42 which is mounted in suitable bearings 44, and a sprocket wheel 46 is rigidly secured to the axle 42. This sprocket wheel may be duplicated on the opposite side of the machine and a pair of sprocket wheels aligned therewith are provided on a shaft 48 secured in bearings 50 in the plates 52 on the upper end of the rear upright member 24, as best illustrated in Figure 3. Gear wheels 54 and 56 are mounted on the shaft 48 and the shaft 58, respectively, the latter shaft being also secured to the rear upright member 24 and the gears 54 and 56 being in mesh, while other sprocket wheels 60 and 62 are secured to the shafts 58 and 64, respectively, the latter shaft being freely rotatably mounted on sprocket members 66 secured to the lower end of the forward upright member 22, as best indicated in Figure 2. The first mentioned sprocket wheels are connected by a drive sprocket chain 68 and the last mentioned sprocket wheels 60 and 62 are connected by two similar endless chains 70 to and between which a plurality of parallel spaced bars 72 are secured, thus comprising what will be hereinafter referred to as the elevator conveyor 74. It should be noted that the upper portion of this conveyor 74 travels within the before mentioned housing 28.

The above described structure provides a power driven axle or shaft 64 at the forward end of the machine, and power is derived therefrom to drive the rotary cylinder, generally indicated by the numeral 76 in Figure 5. Pairs of sprocket wheels are secured to the shaft 64 and to the shaft 78 of the rotary cylinder and sprocket chains 80 and entrained thereon. The rotary cylinder 76 is terminally mounted in brackets 82 which are secured on the platform 16, and this cylinder is comprised of two end discs 84 and a plurality of bars 86 peripherally secured to these discs and provided with a plurality of spaced radially disposed members 88, of tooth character and preferably provided with right angular or blunt ends. It will also be noted that the platform 16 is slotted to coact with the teeth 88 of the rotary cylinder. This platform 16 is also provided with fingers 90 having depending forward ends 92, these fingers being aligned with the said slots, that is, on either side of each slot, and adapted to coact with the teeth of said rotary cylinder and with the tangs 14 of the diggers, to guide the plants onto the platform and thence onto the conveyor.

An electric motor is mounted on a suitable bracket 96 secured to the forward upright 22 and at a level above the forward end of the conveyor, and the shaft of this motor is rigidly secured to a fan 98, enclosed within an annular baffle or shield 100. The function of this fan is to agitate the vines as they are elevated and conveyed toward the rear of the machine, in order to more effectively free the vines from the earth clinging thereto. Obviously, other means may be used to power the fan, although it is preferred to provide a suitable generator on the tractor used to draw the harvester machine and to connect this generator with flexible leads to the electric motor 94.

At the rear end of the machine, a delivery chute, generally indicated by the numeral 102 is provided to transfer the vines transversely of the machine and to deposit the same in a windrow as the machine is forwardly propelled. This delivery chute 102 includes a trough member 104 and an endless chain conveyor 106 which may be very similar to the conveyor 74 described above. The conveyor 106 is actuated by sprocket wheels secured to the shaft 108 which is propelled by the beveled gear 110 enmeshed with the coacting beveled gear 112 secured to one end of the shaft 58, as best shown in Figure 1.

In order that this delivery chute may be raised at one end, a cable 113 is terminally secured to the chute portion 104 and is entrained through pulleys 114 and 116 secured at either side of the top end of the rear uprights 24, extending forwardly to the pulley 118 secured to the forward upright 22, and terminally secured to the reel 120 which is provided with a hand crank 122. The delivery chute is pivotally mounted on the shaft 108 and this shaft is supported at the outer end thereof by a bracket 124 secured to the rear upright member 24. Another similar bracket 126 limits the downward movement of the chute.

The operation of this invention will be clearly understood upon a consideration of the foregoing discussion of the mechanical details thereof, taken in connection with the above recitation of the objects sought to be achieved by this invention, but it may be added, in recapitulation, that the plants are first dug by the diggers 10, raised by the tangs 14 onto the platform 16 where these plants are picked up by the rotary cylinder 76 and fed onto the conveyor 74 which carries them rearwardly and upwardly toward the transversely disposed delivery chute at the rear of the machine. It should be carefully noted that this machine is not a threshing machine and that the action of the conveyor and the fan 98 is not to separate the pods from the vines but rather to merely dislodge the earth from these vines and to eventually deposit the vines in a windrow.

Obviously, many minor variations may be made in this invention without departure from the spirit and scope thereof, and though there has been described a particular embodiment of this invention, this application is not limited to this particular embodiment but it is desired to include in the scope of this invention the construction, combination and arrangement of parts and portions substantially as set forth in the appended claims.

What I claim as novel and improved is:

1. A peanut harvester adapted to be drawn by a tractor and including a digger mounted on a tractor, a wheeled frame with a receiving platform immediately behind said digger, an elevator conveyor on said frame behind said platform, means on said frame to pick up vines and peanuts from said platform and to deliver the same onto said conveyor, means to actuate said elevator conveyor, an inclined delivery chute extending transversely of said elevator conveyor at the rear end thereof, and a blower mounted on said frame adjacent the lower forward end of said elevator conveyor to agitate the vines and thus to assist in removing earth clinging thereto.

2. A peanut harvester adapted to be drawn by a tractor and including a digger mounted on a tractor, a wheeled frame with a receiving platform immediately behind said digger, an elevator conveyor on said frame behind said platform, means on said frame to pick up vines and peanuts from said platform and to deliver the same onto said conveyor, means to actuate said elevator conveyor, an inclined delivery chute extending transversely of said elevator conveyor at the rear end thereof, and a blower mounted on said frame adjacent the lower forward end of said elevator conveyor to agitate the vines and thus to assist in removing earth clinging thereto, said platform including a plurality of spaced parallel fingers and said means to pick up vines and peanuts including a rotary cylinder having radially extending teeth and means to rotate said cylinder.

3. A peanut harvester adapted to be drawn by a tractor and including a digger mounted on a tractor, a wheeled frame with a receiving platform immediately behind said digger, an elevator conveyor on said frame behind said platform, means on said frame to pick up vines and peanuts from said platform and to deliver the same onto said conveyor, means to actuate said elevator conveyor, an inclined delivery chute extending transversely of said elevator conveyor at the rear end thereof, and a blower mounted on said frame adjacent the lower forward end of said elevator conveyor to agitate the vines and thus to assist in removing earth clinging thereto, said chute having a chain conveyor associated therewith.

4. A peanut harvester adapted to be drawn by a tractor and including a digger mounted on a tractor, a wheeled frame with a receiving platform immediately behind said digger, an elevator conveyor on said frame behind said platform, means on said frame to pick up vines and peanuts from said platform and to deliver the same onto said conveyor, means to actuate said elevator conveyor, an inclined delivery chute extending transversely of said elevator conveyor at the rear end thereof, and a blower mounted on said frame adjacent the lower forward end of said elevator conveyor to agitate the vines and thus to assist in removing earth clinging thereto, said wheeled frame having means to adjust the height of said platform above the ground.

JESSE O. TURNER.

REFERENCES CITED

The following references are of record in the file of this patent:

UNITED STATES PATENTS

| Number | Name | Date |
|---|---|---|
| 451,329 | Larson | Apr. 28, 1891 |
| 1,288,541 | Fant | Dec. 24, 1918 |
| 2,095,428 | Batie | Oct. 12, 1937 |
| 2,297,065 | McLendon | Sept. 29, 1942 |
| 2,381,172 | Lundberg | Aug. 7, 1945 |
| 2,383,506 | McClenny | Aug. 28, 1945 |

FOREIGN PATENTS

| Number | Country | Date |
|---|---|---|
| 118,295 | Australia | Mar. 30, 1944 |